United States Patent
Grigsby et al.

(10) Patent No.: US 9,043,483 B2
(45) Date of Patent: May 26, 2015

(54) VIEW SELECTION IN A VEHICLE-TO-VEHICLE NETWORK

(75) Inventors: Travis M. Grigsby, Austin, TX (US);
Steven M. Miller, Cary, NC (US);
Pamela A. Nesbitt, Tampa, FL (US);
Lisa A. Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1335 days.

(21) Appl. No.: 12/049,451

(22) Filed: Mar. 17, 2008

(65) Prior Publication Data

US 2009/0231432 A1  Sep. 17, 2009

(51) Int. Cl.
| | |
|---|---|
| G06F 15/16 | (2006.01) |
| G06F 15/167 | (2006.01) |
| G06F 15/173 | (2006.01) |
| G08G 1/16 | (2006.01) |
| H04W 84/00 | (2009.01) |
| G08G 1/0965 | (2006.01) |
| G08G 1/00 | (2006.01) |
| H04W 84/18 | (2009.01) |

(52) U.S. Cl.
CPC ............. *G08G 1/161* (2013.01); *B60R 2300/30* (2013.01); *B60R 2300/00* (2013.01); *B60R 2300/70* (2013.01); *B60R 2300/50* (2013.01); *H04W 84/005* (2013.01); *G08G 1/0965* (2013.01); *G08G 1/00* (2013.01); *H04W 84/18* (2013.01)

(58) Field of Classification Search
CPC ....... G08G 1/161; G08G 1/00; G08G 1/0965;
G08G 1/096888; B60R 16/0315; B60R 2300/00; B60R 2300/30; B60R 2300/50; B60R 2300/70; H04W 84/005; H04W 84/18
USPC ......... 709/201, 213, 217–218, 223, 225, 231, 709/238
See application file for complete search history.

(56) References Cited

U.S. PATENT DOCUMENTS

| | | | |
|---|---|---|---|
| 5,621,645 | A | 4/1997 | Brady |
| 5,825,283 | A | 10/1998 | Camhi |

(Continued)

FOREIGN PATENT DOCUMENTS

WO    2005048600 A1    5/2005

OTHER PUBLICATIONS

Tracy Staedter, "Hello, from the car in Front,", Jun. 12, 2007, from http://www.abc.net.au/science/news/stories/2007/194084.

(Continued)

*Primary Examiner* — Patrice Winder
*Assistant Examiner* — Angela Widhalm
(74) *Attorney, Agent, or Firm* — Jordan IP Law, LLC

(57) ABSTRACT

In V2V or other networks in which multiple video cameras can share video data, a network participant ordinarily has the option of selecting a particular video data stream (either generated by local cameras or received from other network participants. To facilitate the process of selecting a video data stream for presentation, the user's vehicle (in a V2V network) receives video data streams generated by other network participants along with identifiers indicating the video data stream actually being presented to the sender. The receiving system identifies the received video data stream by the greatest number of network participants and displays the identified video data stream on the user's in-vehicle video display.

15 Claims, 7 Drawing Sheets

(56) References Cited

U.S. PATENT DOCUMENTS

| | | | |
|---|---|---|---|
| 5,986,650 A | 11/1999 | Ellis et al. | |
| 6,049,756 A | 4/2000 | Libby | |
| 6,208,270 B1 | 3/2001 | Dunn | |
| 6,211,907 B1 | 4/2001 | Scaman et al. | |
| 6,593,960 B1 | 7/2003 | Sugimoto et al. | |
| 6,608,559 B1 | 8/2003 | Lemelson et al. | |
| 6,734,787 B2 | 5/2004 | Ikeda | |
| 6,735,152 B2 | 5/2004 | Sato et al. | |
| 6,813,777 B1 | 11/2004 | Weinberger et al. | |
| 6,850,269 B2* | 2/2005 | Maguire | 348/149 |
| 6,871,971 B2 | 3/2005 | Morrison | |
| 6,937,763 B2 | 8/2005 | Koike et al. | |
| 6,965,604 B1 | 11/2005 | Sato et al. | |
| 7,034,668 B2 | 4/2006 | Engelman et al. | |
| 7,100,190 B2* | 8/2006 | Johnson et al. | 725/105 |
| 7,174,402 B2 | 2/2007 | Ellerbrock et al. | |
| 7,178,106 B2 | 2/2007 | Lamkin et al. | |
| 7,188,026 B2* | 3/2007 | Tzamaloukas | 701/522 |
| 7,193,645 B1 | 3/2007 | Aagaard et al. | |
| 7,227,493 B2 | 6/2007 | Oswald et al. | |
| 7,248,968 B2 | 7/2007 | Reid | |
| 7,353,110 B2* | 4/2008 | Kim | 701/438 |
| 7,450,603 B2* | 11/2008 | Nix et al. | 370/432 |
| 7,463,138 B2 | 12/2008 | Pawlicki et al. | |
| 7,477,758 B2 | 1/2009 | Piirainen et al. | |
| 7,483,693 B2* | 1/2009 | Lueng et al. | 455/414.1 |
| 7,501,934 B2 | 3/2009 | Tischer | |
| 7,711,699 B2* | 5/2010 | Koromyslov et al. | 701/117 |
| 7,813,822 B1 | 10/2010 | Hoffberg | |
| 7,877,196 B2* | 1/2011 | Lin et al. | 701/117 |
| 7,938,727 B1 | 5/2011 | Konkle | |
| 7,983,206 B2* | 7/2011 | Tian | 370/312 |
| 8,117,281 B2* | 2/2012 | Robinson et al. | 709/218 |
| 8,330,791 B2 | 12/2012 | Gorzynski et al. | |
| 8,340,904 B2* | 12/2012 | Lin | 701/465 |
| 8,478,209 B2* | 7/2013 | Bai et al. | 455/99 |
| 2002/0095367 A1* | 7/2002 | Mizunuma et al. | 705/37 |
| 2002/0164962 A1 | 11/2002 | Mankins et al. | |
| 2003/0023974 A1 | 1/2003 | Dagtas et al. | |
| 2003/0186675 A1 | 10/2003 | Davis et al. | |
| 2003/0210806 A1 | 11/2003 | Yoichi et al. | |
| 2004/0022416 A1 | 2/2004 | Lemelson et al. | |
| 2004/0036622 A1 | 2/2004 | Dukach et al. | |
| 2005/0004753 A1 | 1/2005 | Weiland et al. | |
| 2005/0010955 A1* | 1/2005 | Elia et al. | 725/88 |
| 2005/0031169 A1 | 2/2005 | Shulman et al. | |
| 2005/0102374 A1 | 5/2005 | Moragne et al. | |
| 2005/0185823 A1 | 8/2005 | Brown et al. | |
| 2005/0225634 A1 | 10/2005 | Brunetti et al. | |
| 2005/0278088 A1 | 12/2005 | Thorner | |
| 2006/0045115 A1* | 3/2006 | Nix et al. | 370/432 |
| 2006/0184538 A1* | 8/2006 | Randall et al. | 707/10 |
| 2006/0187305 A1 | 8/2006 | Trivedi et al. | |
| 2007/0005795 A1* | 1/2007 | Gonzalez | 709/232 |
| 2007/0018952 A1 | 1/2007 | Arseneau et al. | |
| 2007/0052856 A1 | 3/2007 | Jung et al. | |
| 2007/0139523 A1 | 6/2007 | Nishida et al. | |
| 2007/0159354 A1* | 7/2007 | Rosenberg | 340/902 |
| 2007/0174467 A1* | 7/2007 | Ballou et al. | 709/227 |
| 2007/0195939 A1 | 8/2007 | Sink et al. | |
| 2008/0088706 A1 | 4/2008 | Girgensohn et al. | |
| 2008/0089299 A1* | 4/2008 | Lindsley et al. | 370/338 |
| 2008/0181132 A1 | 7/2008 | Underhill et al. | |
| 2008/0199050 A1 | 8/2008 | Koitabashi | |
| 2008/0211907 A1 | 9/2008 | Kelly et al. | |
| 2008/0220760 A1* | 9/2008 | Ullah | 455/420 |
| 2008/0242221 A1 | 10/2008 | Shapiro et al. | |
| 2008/0255754 A1* | 10/2008 | Pinto | 701/119 |
| 2009/0023446 A1* | 1/2009 | Das | 455/435.2 |
| 2009/0041300 A1 | 2/2009 | Mack | |
| 2009/0063419 A1* | 3/2009 | Nurminen et al. | 707/3 |
| 2009/0092183 A1* | 4/2009 | O'Hern | 375/240.01 |
| 2009/0096937 A1 | 4/2009 | Bauer et al. | |
| 2009/0122740 A1 | 5/2009 | Bouazizi | |
| 2009/0226001 A1* | 9/2009 | Grigsby et al. | 381/77 |
| 2009/0282164 A1 | 11/2009 | Fuehrer et al. | |
| 2010/0131642 A1* | 5/2010 | Chalikouras et al. | 709/224 |
| 2010/0175086 A1* | 7/2010 | Gaydou et al. | 725/39 |
| 2010/0321183 A1 | 12/2010 | Donovan et al. | |
| 2014/0316611 A1 | 10/2014 | Da Silva et al. | |

OTHER PUBLICATIONS

Author Unknown, "Dedicated Short Range Communications", from http://en.wikipedia.org/wiki/Dedicated_Short_Range_Communications.

Non-Final Office Action for U.S. Appl. No. 12/049,471, mailed Oct. 7, 2011, 11 pages, U.S. Patent and Trademark Office.

Final Office Action for U.S. Appl. No. 12/049,471, mailed Jun. 15, 2012, 17 pages, U.S. Patent and Trademark Office.

Non-Final Office Action for U.S. Appl. No. 12/049,489, mailed Oct. 7, 2011, 9 pages, U.S. Patent and Trademark Office.

Final Office Action for U.S. Appl. No. 12/049,489, mailed Apr. 10, 2012, 15 pages, U.S. Patent and Trademark Office.

Non-Final Office Action for U.S. Appl. No. 12/049,436, mailed Nov. 18, 2011, 11 pages, U.S. Patent and Trademark Office.

Non-Final Office Action for U.S. Appl. No. 13/419,481, mailed Feb. 11, 2015, 22 pages, U.S. Patent and Trademark Office.

Notice of Allowance for U.S. Appl. No. 12/049,471, mailed Dec. 19, 2014, 27 pages, U.S. Patent and Trademark Office.

* cited by examiner

VIEW SELECTION IN A VEHICLE-TO-VEHICLE NETWORK

CROSS-REFERENCE TO RELATED APPLICATIONS

This application is related to U.S. patent application Ser. No. 12/049,436 filed concurrently herewith, to U.S. patent application Ser. No. 12/049,458 filed concurrently herewith, to U.S. patent application Ser. No. 12/049,471 filed concurrently herewith, and to U.S. patent application Ser. No. 12/049,489 filed concurrently herewith.

BACKGROUND OF THE INVENTION

The present invention relates to vehicle-to-vehicle (V2V) networks and more particularly to selection of video data streams for display by participants in such networks.

Efforts have been underway for some time to establish standards for and to develop technology that would allow drivers within limited geographic areas to "talk" to each other by participating in ad hoc vehicle-to-vehicle networks in which audio, video and other data is shared among participating vehicles. It is envisioned that each vehicle participating in such a vehicle-to-vehicle network would be equipped with microphones for capturing audio data that could be shared directly with other vehicles independently of any existing communications networks, such as cellular telephone networks, and with video cameras for capturing video data both for use within the participating vehicle and for sharing with other vehicles participating in the network.

According to one proposal, data would be shared among vehicles using a Dedicated Short Range Communications (DSRC) wireless protocol operating in the 5.9 Gigahertz band that would support direct vehicle-to-vehicle communications over a relatively short range (100 meters-300 meters). The effective size of the network implemented using the DSRC would be significantly greater than the direct vehicle-to-vehicle maximum range, however, since each vehicle could relay data received from another vehicle to still other vehicles within its range. Relayed data could "hop" one vehicle at the time to vehicles progressively further away from the vehicle that was the source of the data.

Vehicle-to-vehicle networks will serve the general purpose of making participating drivers more aware of what is happening around them and a number of specific purposes, including safety-related purposes. Such networks would permit drivers to alert other drivers of traffic slowdowns, road hazards and approaching emergency vehicles. Such networks could also enable emergency vehicle personnel to alert drivers to their presence, letting alerted drivers anticipate the appearance of the emergency vehicles and more quickly clear paths for them.

The ability of a participating driver to readily choose among video data streams generated by video cameras installed in other participating vehicles is a major factor in enabling vehicle-to-vehicle networks to serve such purposes.

BRIEF SUMMARY OF THE INVENTION

The present invention may be implemented as a method of determining which video data stream is to be presented on a video display used by a first participant in a network in which multiple participants produce video data streams that may be shared among other participants. Video data streams are received from other participants in the network. The video data stream actually being viewed by the greatest number of participants is identified and is presented on the video display used by the first participant.

The present invention may also be implemented as a computer program product for determining which video stream is to be presented on a video display used by a first participant in a network in which multiple participants produce video data streams that may be shared among other participants. The computer program product includes a computer usable medium embodying computer usable code configured to receive data streams from a plurality of other participants, identify which of the received data streams is currently being presented on displays used by the greatest number of other participants and present the identified data stream on the video display used by the first participant.

The present invention may also be implemented in a system including a display and a controller for selecting a video data stream to be presented on a video display used by a first participant in a network. The system includes a video input system for receiving video data streams from other participants in the network and a video storage module for storing received video data streams. The system further includes a popularity logic module for selecting the received video data stream currently being viewed by the greatest number of other participants in the network. A video output system directs the video data stream selected by the popularity logic module to the video display for viewing by the first participant.

DETAILED DESCRIPTION OF THE INVENTION

Figure 1:
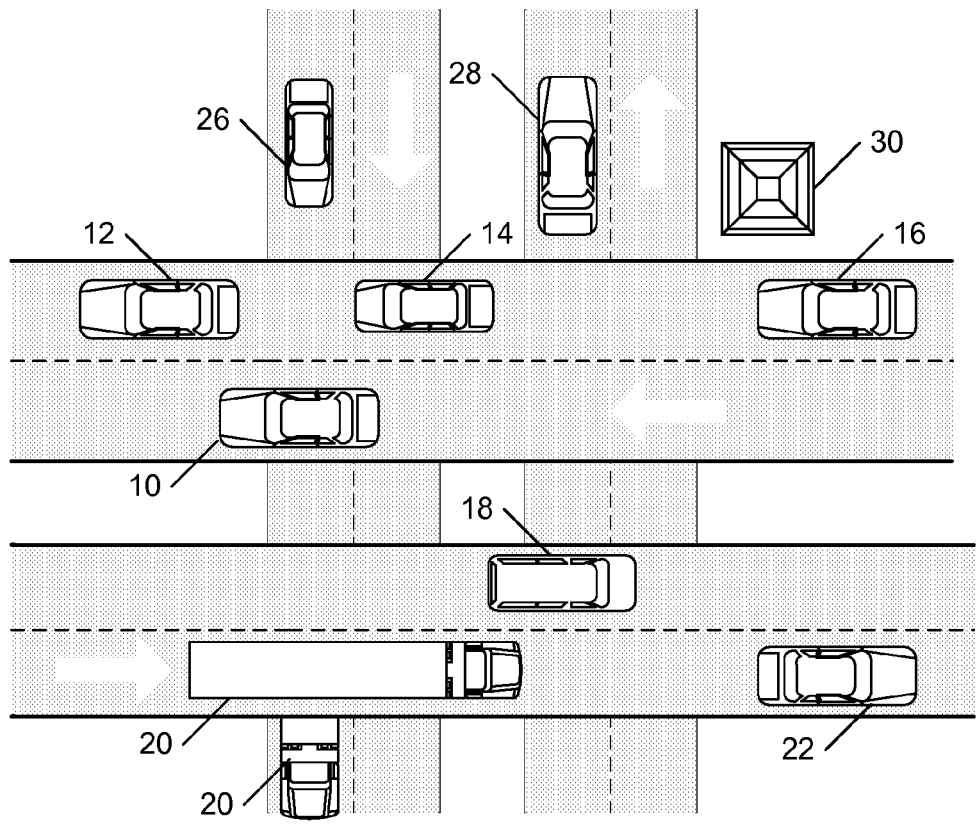
FIG. 1 is an illustration of several roadways traveled by cars and trucks that could participate in a vehicle-to-vehicle network of the type in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1 and assuming that all of the vehicles shown there are properly equipped, any of the vehicles, such as car 10, may elect to participate in an ad hoc vehicle-to-vehicle (V2V) network including not only car 10 but also cars 12, 14, and 16 that are traveling in the same direction as car 10, cars 18 and 22 and tractor-trailer 20 that are traveling in the opposite direction and even cars 26 and 28 and truck 24 that are traveling orthogonally to car 10. Being a participant in a V2V network means that each participating vehicle will be able to share both locally generated and received audio and video data as well as control data with other participating vehicles.

As a practical matter, roadside base stations, such as base station 30, may be considered participants in V2V networks by receiving data from and providing data to vehicles in the network even though the base stations obviously do not satisfy any conventional definition of the word "vehicle".

Figure 2:
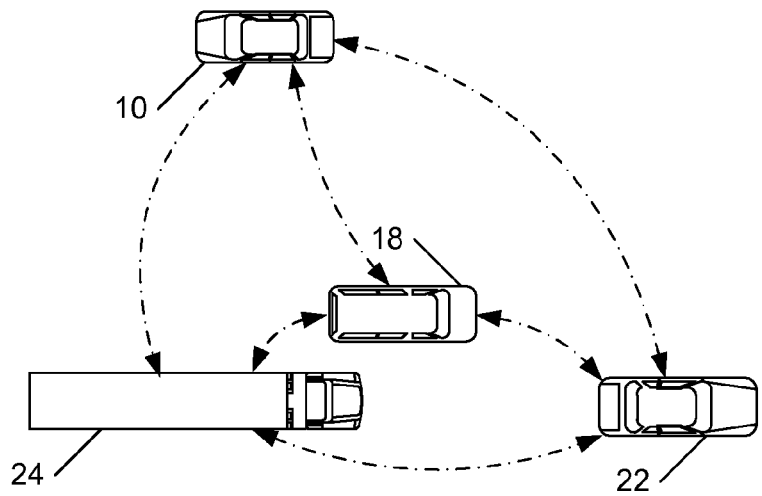
FIG. 2 is an illustration of a few of the cars and trucks that appear in FIG. 1 with additional graphics representing peer-to-peer communication paths among the vehicles.

Referring to FIG. 2, communications among participating vehicles are preferably conducted on a peer-to-peer basis that enables any vehicle in the network to wirelessly communicate directly with any other participating vehicle within a predetermined range determined by the wireless protocol implemented by the network. As noted earlier, the Dedicated Short Range Communications wireless protocol developed for automotive applications has an effective range on the order of 100 to 300 meters, which would be sufficient to enable car 10 to communicate directly with at least cars 18 and 22 and tractor-trailer 20 along with other nearby vehicles (not shown).

The size of the ad hoc network from the perspective of car 10 (or any other participant in the network) is not limited to vehicles with which car 10 may communicate directly. Each participating vehicle can act as a relay point, receiving data from a nearby vehicle and passing it on to other vehicles that are within the direct communication range of the relaying vehicle regardless of whether the target vehicles are beyond the direct communication range of the vehicle from which the data originated. Thus, data can radiate along chains of vehicles, only one or a few of which may be within the direct communication range of the data source.

Figure 3:
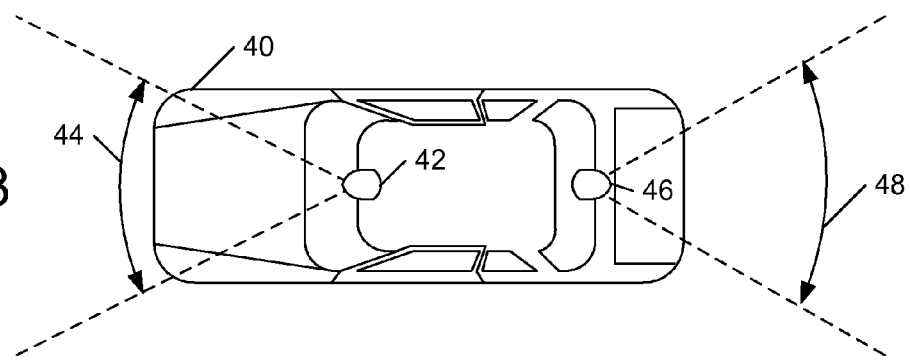
FIG. 3 is an illustration of a single vehicle showing multiple video cameras that could provide video data for use within the vehicle and sharing with other vehicles participating in the vehicle-to-vehicle network.

Referring to FIG. 3, it is assumed that any vehicle that participates in a typical V2V network will have a least one video camera, such as video camera 42 that is mounted on or near the interior rearview mirror of vehicle 40 to provide a video field of view 44 that approximates what the driver of vehicle 40 actually sees when seated behind the steering wheel. Video data captured by video camera 42 would probably be more useful to other participating drivers than to the driver of vehicle 40. The vehicle 40 could, of course, be equipped with additional video cameras, such as a trunk-mounted video camera 46 having a field of view 48 directly behind vehicle 40, and even other side-mounted video cameras (not shown) that could be used to overcome blind spots that occur when only conventional exterior rearview mirrors are used.

Figure 4:
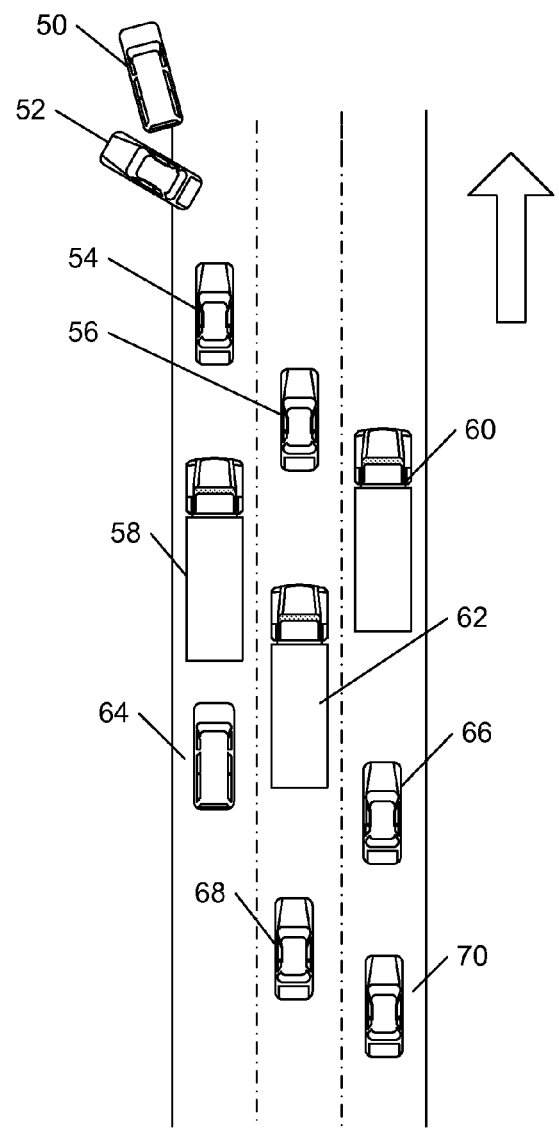
FIG. 4 is an illustration of a typical traffic scenario in which the present invention would be extremely useful to at least some of the drivers of the illustrated vehicles.

As anyone who has ever driven a motor vehicle knows, there are times that a driver will be far more interested in knowing what other drivers can see than what he can see from his own vehicle, even with the assistance of video cameras mounted on his own vehicle. FIG. 4 illustrates one of those times.

The Figure shows a small section of one side of a six lane divided highway (three travel lanes in each direction of travel) in which two vehicles 50 and 52, either as a result of an accident or breakdowns, have come to rest on the left shoulder of the highway, partially blocking the nearest travel lane. As can be expected, the disabled vehicles 50 and 52 have caused a slowdown in approaching traffic, including cars 54, 56, 62, 64, 66, 68 and 70 and tractor-trailers 58, 60 and 62. Of the vehicles on the highway, however, only car 54 and tractor-trailer 58 are likely to be able to clearly see the disabled vehicles 50 and 52 and thus a good of idea of what is causing the slowdown. The view of each other vehicle shown will be blocked, at least to some extent, by other vehicles. Cars 64, 66, 68 and 70, in particular, will be completely unable to see the disabled vehicles and will have no idea what has caused the slowdown and which lanes, if any, are likely to be blocked. Without even basic information as to what is causing the slowdown, the drivers of cars 64, 66, 68 and 70 will have no idea whether they should remain in their current lanes, attempt to merge left or attempt to merge right in order to get by whatever is causing the slowdown.

As noted earlier, vehicles participating in a vehicle-to-vehicle network are likely to be equipped with video cameras generating live video data streams for use within the vehicle and for sharing with other vehicles participating in the network. In a situation such as the one illustrated in FIG. 4, it can be expected that drivers caught in the slowdown will be very interested in seeing the video data stream that provides the clearest view of the reason for the slowdown. At least transiently, the video data stream that provides the clearest view of the reason for the slowdown will probably be selected for viewing in the greatest number of vehicles in the vicinity of the slowdown; that is, will be the most "popular" video data stream in the vicinity.

While drivers could always cycle through incoming video data streams manually to identify the most popular video data stream at the moment, that would mean that each driver's attention would be distracted as the driver viewed each incoming video data stream to decide whether it should be selected for presentation on the in-vehicle video display. It goes without saying that anything that distracts drivers can create safety problems beyond those created by the original cause of a slowdown.

The present invention reduces the chances of troublesome driver distraction by a least partially automating the process of selecting the most popular video data stream in a driver's ad hoc vehicle-to-vehicle network at any given time. The automation is carried out in a data processing system that is capable of receiving, storing and processing the various kinds of data (audio, video and other) that are generated by vehicles participating in a vehicle-to-vehicle network.

Figure 5:
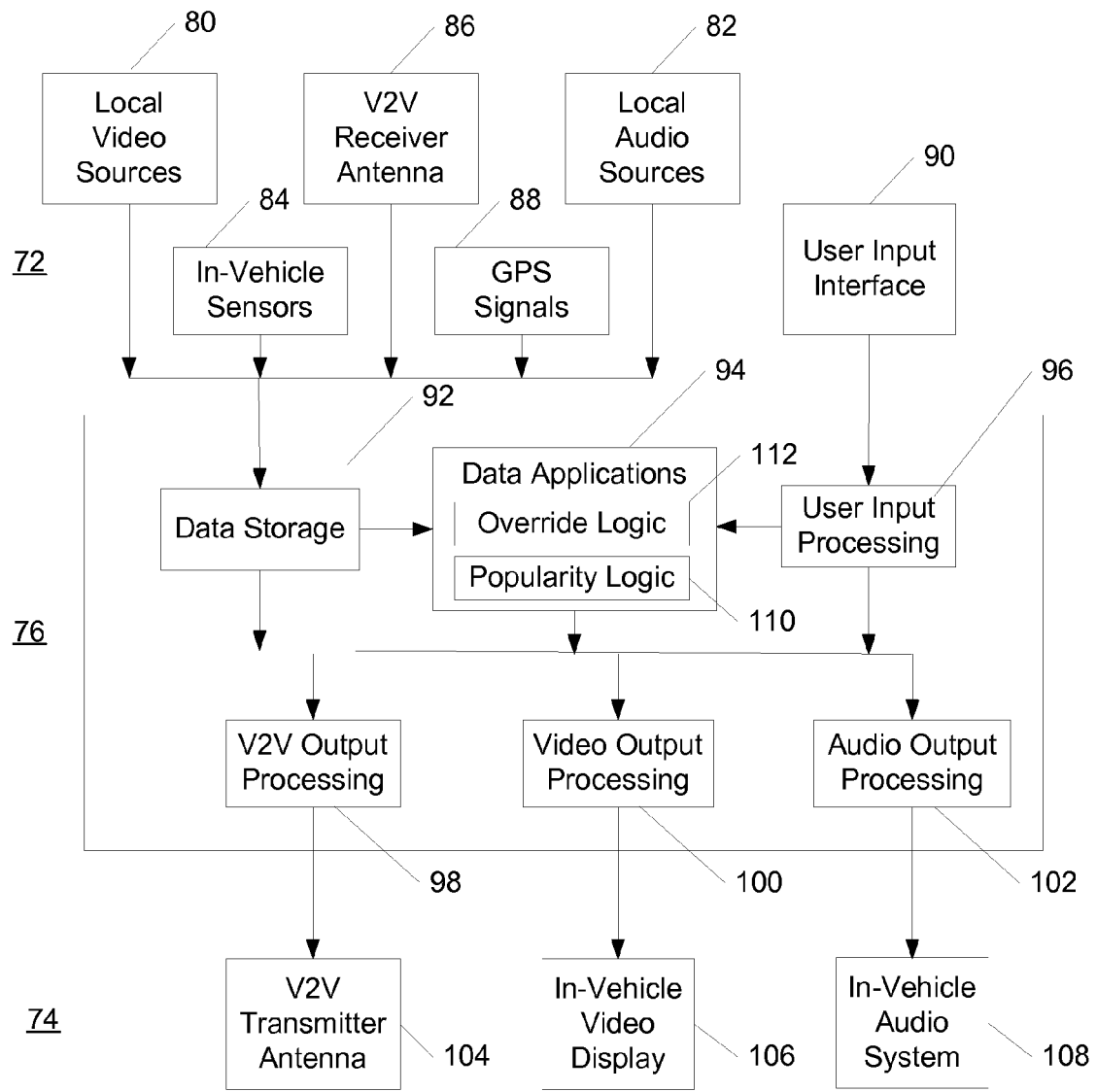
FIG. 5 is the functional block diagram of a system that could be employed to implement the present invention.

FIG. 5 is a functional block diagram of the major functional components for such a data processing system. The data processing system can be roughly divided into three major subsystems: an input subsystem 72, an output subsystem 74, and a data processing subsystem 76 that processes incoming data provided by the input subsystem 72 to provide the output data utilized by the output subsystem 74.

The input subsystem 72 includes local video sources 80 such as vehicle-mounted video cameras of the type already discussed and local audio sources 82, including such sources as vehicle-mounted microphones for capturing voice input from drivers and/or passengers or Bluetooth or other wireless protocols that support the capture of such voice input from wireless headsets used by drivers and/or passengers. The input subsystem 72 further includes connections to in-vehicle sensors 84, an obvious example of which is the vehicle speedometer, and to a GPS or Global Positioning System subsystem 88 that provides the vehicle's current global location.

The input subsystem 72 further includes a user input interface 90 for acquiring user data and commands. The user input interface can be implemented in a number of known ways. Key input technologies, touchscreen technologies and voice recognition technologies are nonexclusive examples of technologies that can be employed to capture user input.

All of the input subsystems described above can be characterized as local subsystems in that they capture data originating at the vehicle itself. The essence of a V2V network is that each vehicle participating in the network can make use of data provided by other participating vehicles. To make that possible, the input subsystem 72 must include a V2V receiver antenna 86 to acquire audio, video and other data from other vehicles participating in the V2V network.

Input data, both local and remote, is at least initially stored in a data storage subsystem 92 in the data processing subsystem 76. Stored data is retrieved from storage for use by data applications 94 that may be invoked by the vehicle driver or passengers using commands entered at the interface 90 and processed in a user input processing subsystem 96.

Output data resulting from execution of data applications in subsystem 94 may be made available to other participating vehicles through the use of a V2V output processing subsystem 98 connected to a V2V transmitter antenna 104. Depending upon the technologies employed, V2V transmitter antenna 104 and V2V receiver antenna 86 may be the same physical device. Output data may, of course, be used within the vehicle as well. Data intended for an in-vehicle video display 106 undergoes processing in a video output processing stage 100 before being directed to the display. Similarly, data intended for the in-vehicle audio system 108 is processed in an audio output processing stage 102 before being sent to the audio system.

In the illustrated data processing system, the logic for automating the process of identifying the most popular video data stream in a driver's ad hoc vehicle-to-vehicle network at a given time resides in a popularity logic module 110 that is part of the data applications section 94. The operations performed by the popularity logic module 110 will be described in detail below.

In one embodiment of the invention, the data applications section 94 also includes override logic 112 which can be invoked by authorized external users, such as emergency vehicles or local government authorities, to temporarily commandeer the in-vehicle vehicle display for presentation of emergency messages or video data streams, overriding the presentation of any video data streams previously selected by the driver or the data processing system. The operation of override logic 112 is also described in detail below.

Figure 6A:
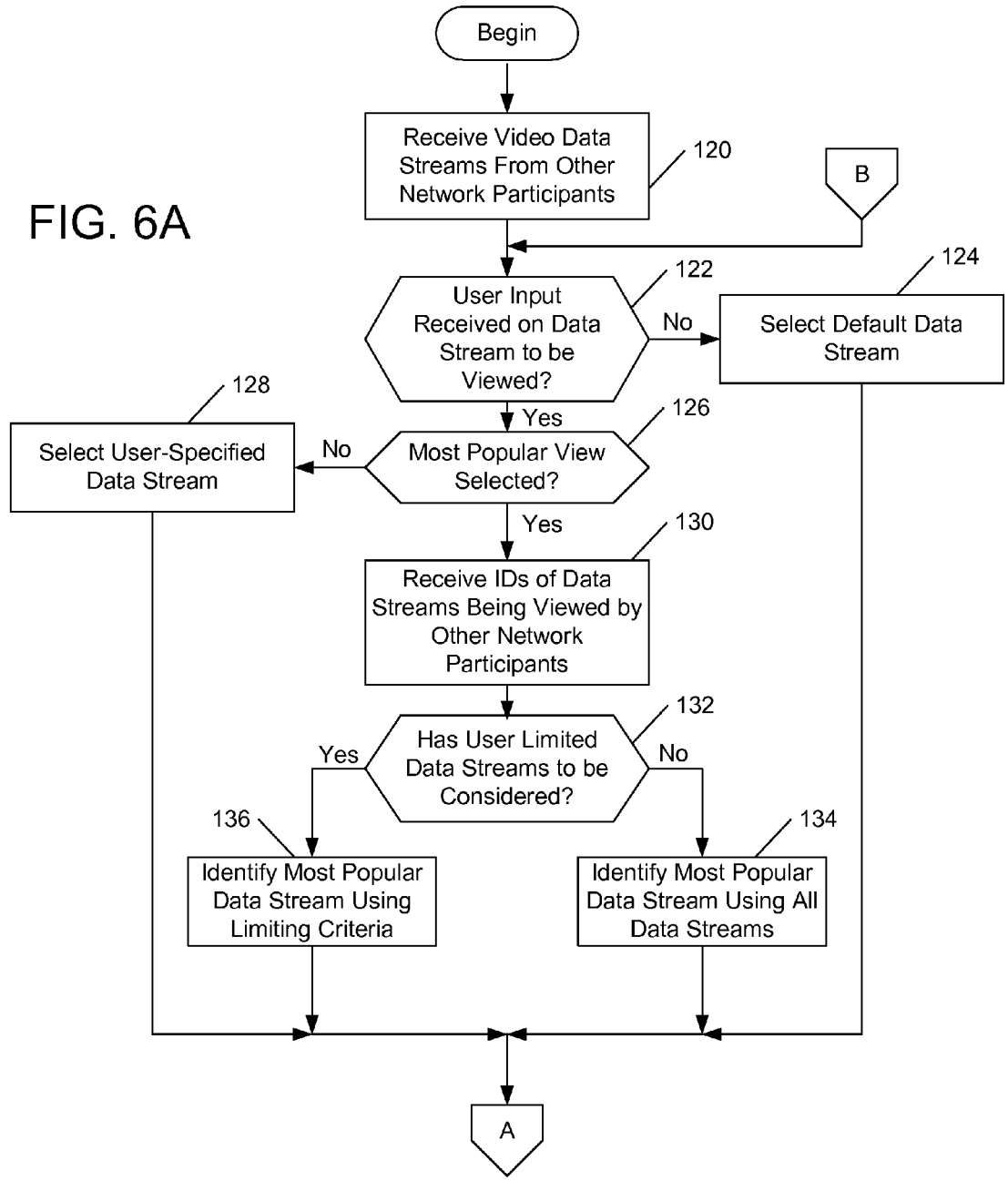
FIG. 6, consisting of FIGS. 6A and 6B taken together, is a flow chart representing operations that would be performed in selecting a particular video data stream for presentation on a video display used by a first participant in a network.
Figure 6B:
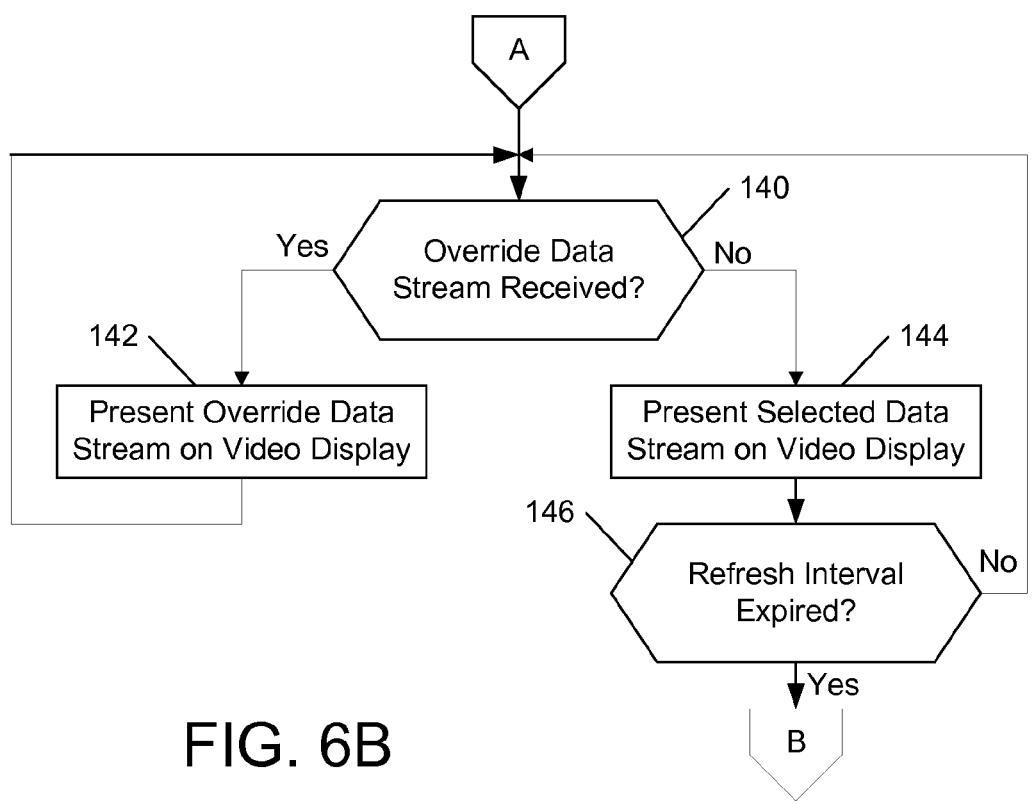

FIG. 6 is a flow chart of operations that are performed in the data processing system previously described with reference to FIG. 5 in implementing the present invention. For purposes of the flowchart, it is assumed that the data processing system has already been activated and is operating normally.

As part of the normal system operation, video data streams generated by other participants in the vehicle-to-vehicle network are received and stored (operation 120) at a first participant's vehicle on an on-going basis. An operation 122 determines whether the first participant has provided any input indicating which of the video data streams should be presented on an in-vehicle video display. If the first participant has provided no such input, the data processing system selects a default video data stream (operation 124) for presentation. The default video data stream may be one "hardwired" into the system by its manufacturer or one previously chosen by the participant as part of a system initialization process; e.g., a video data stream presented by a rear-facing video camera mounted in the rear window or on a side rearview mirror.

Assuming the first participant has provided input, a check (operation 126) determines whether the user input was that the most popular video data stream in the network should be presented on the in-vehicle video display. If operation 126 shows that the first participant has not selected the most popular video data stream to be displayed, then the video data stream actually designated by the participant is selected (operation 128) for presentation on the in-vehicle video display.

If the first participant selects the most popular video data stream for presentation, the system identifies (operation 130) the video data streams actually being viewed by other network participants. In one embodiment of the invention, each vehicle participating in a vehicle-to-vehicle network sends other participants the video data stream actually being displayed at any given time, along with an identifier of that video data stream. In a second embodiment of the invention, each participating vehicle sends other participants a default video data stream (such as one being generated by a vehicle-mounted forward-facing video camera) without regard to whether the default video data stream is actually being presented on the sending vehicle's video display. In the second embodiment, each vehicle would separately send both its default video data stream and a separate identifier for the video data stream actually being viewed on the sending vehicle's video display at the time of sending.

Under some circumstances, a driver may wish to limit the video data streams that should be considered in making a popularity determination. For example, if a driver is trying to find out why traffic has slowed ahead of him, he is likely to have little interest in video data streams being viewed in vehicles going in the opposite direction or in vehicles behind him. As will be explained in more detail below, a user interface can be provided to make it easier for a driver can filter or limit the video data streams to be considered.

If a check (operation 132) reveals the driver has provided limiting criteria defining a subset of received video data streams that should be considered, the numbers of participants in the defined subset that are currently viewing each of the video data streams are tallied (operation 136) to determine which video data stream in the subset is currently being viewed by the greatest number of participants in the subset. If check 132 reveals the driver has not provided limiting criteria, then the numbers of other participants that are currently viewing any of the received video data streams are tallied (operation 134) to determine which received video data stream is currently being viewed by the greatest number of network participants.

A video data stream selected by one of the operations 124, 128, 134 and 136 may or may not then be presented on the first participant's in-vehicle video display. If a following operation 140 shows that an override video data stream is being received by the in-vehicle data processing system, the override video data stream preempts any other video data stream and is presented immediately on the in-vehicle display in an operation 142. There are numerous examples and no real limits on what might constitute a video message that qualifies as an override video message.

It is foreseeable that governmental authorities may equip emergency vehicles, such as police cars, fire trucks and ambulances, with video message generators capable of generating override video messages that can be broadcast to every other vehicle in an ad hoc vehicle-to-vehicle network in which the emergency vehicle is a participant. Broadcast override video messages could warn other network participants of major traffic problems ahead or of the approach of the emergency vehicle. Such video messages could include specific directions (e.g., Move immediately as far as possible to the right!) that could be adhered to by the recipients before they ever see the approaching emergency vehicle. Other foreseeable emergency messages could include missing child alerts or warnings of slippery road conditions ahead of the participating driver.

If operation 140 does not find any override data streams, the video data stream selected by one of the operations 124, 128, 134 and 136 is presented on the in-vehicle video display in an operation 144. In one embodiment of the invention, a selected video data stream will continue to be displayed on the in-vehicle video display (unless overridden by an override video data stream) for at least the duration of a predetermined refresh interval. Once an operation 146 determines the refresh interval has expired, the entire process of video data stream for presentation (beginning at operation 122) is repeated, possibly resulting in an automatic change in the presented view.

Figure 7:
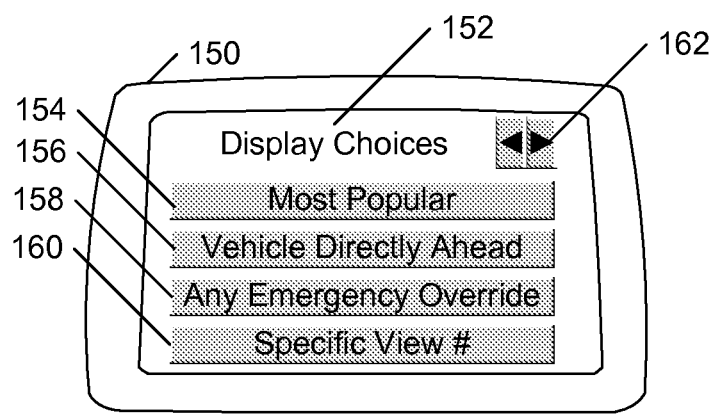
FIG. 7 illustrates one user interface screen that may be employed to facilitate a participant's selection of a particular video data stream for presentation on a video display.

FIG. 7 illustrates a device 150 that provides one form of user interface for designating particular video data streams for display. Device 150 is assumed to have a touch sensitive screen that can be used to provide programmatic user menus in the form of "soft" buttons or keys. The particular programmatic menu shown in the drawing includes a header 152 indicating the primary function of the screen and a series of "soft" buttons that allow the user to select the most popular video data stream (button 154), a video data stream generated by the vehicle directly ahead of the user's vehicle (button 156), or a video data stream generated by any emergency vehicle or authority participating in the network (button 158) or a video data stream having an identifying number known to the user (button 160). The screen may also include spin buttons 162 that would allow the user to page forward or backward to other screens.

Figure 8:
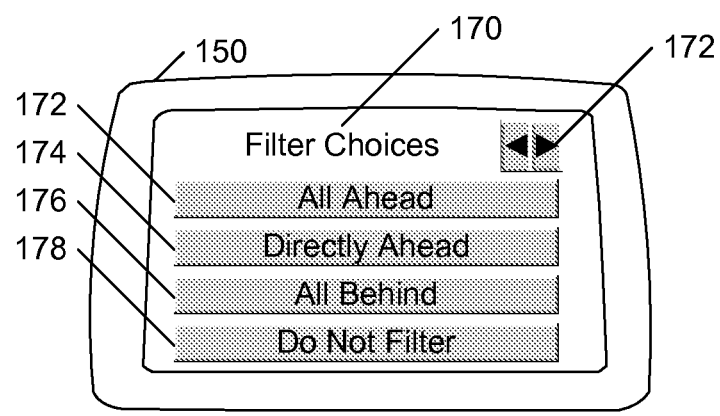
FIG. 8 illustrates another user interface screen that may be employed to facilitate a participant's selection of a subset of received video data streams to be considered in choosing a particular video data stream for presentation on a video display.

FIG. 8 shows the same device 150 when used to permit the user to establish a subset of the video data streams to be considered when choosing the most popular video data stream for presentation on the user's in-vehicle video display. The major function of the screen is indicated by header 170 while the specific choices available to the user are indicated by a set of "soft" buttons 172, 174, 176 and 178. By selecting button 172, the user can limit the subset of video data streams generated by all vehicles ahead of the user's vehicle provided they are traveling in the same direction as the user. Button 174 allows the user to limit the subset to only those vehicles directly ahead of the user's vehicle while button 176 allows the user to limit the subset to vehicles behind the user's vehicle but traveling in the same direction. Button 178 allows the user to specify no filtering is to be performed, which results in the selection of the most popular video data stream being based on all received video data streams. As before, the screen may include a set of spin buttons 172 that enable the user to page forward and backward to other screens.

Figure 9:
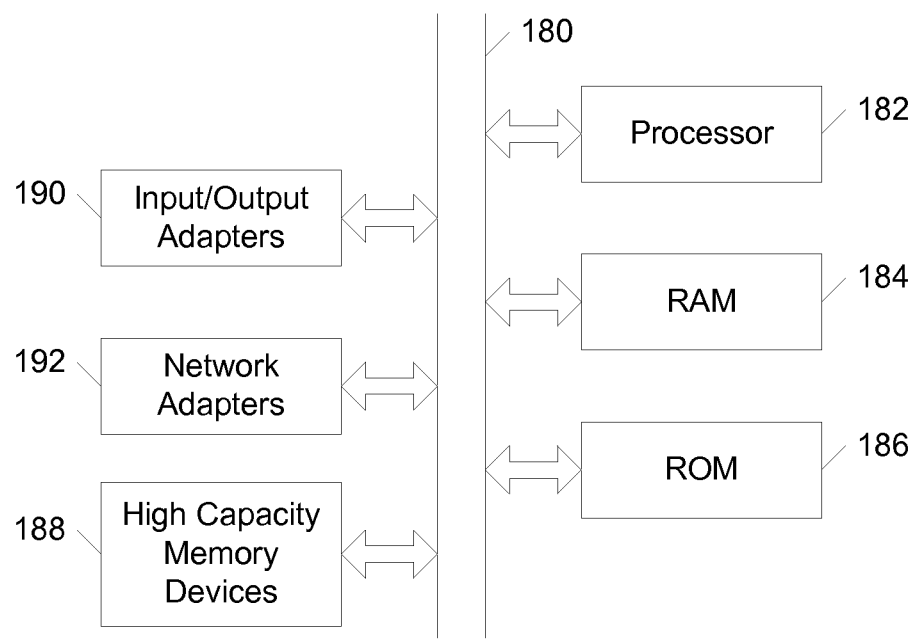
FIG. 9 is a functional block diagram of the hardware infrastructure of a programmable general-purpose computer device that could be used in implementing the present invention.

The invention may be implemented through the use of special-purpose hardware of the type functionally described earlier. Alternatively, the invention may be implemented by programming a general purpose computer device having an infrastructure of the type illustrated in FIG. 9. The infrastructure includes a system bus 180 that carries information and data among a plurality of hardware subsystems including a processor 182 used to execute program instructions received from computer applications running on the hardware. The infrastructure also includes random access memory (RAM) 184 that provides temporary storage for program instructions and data during execution of computer applications and are read only memory (ROM) 186 often used to store program instructions required for proper operation of the device itself, as opposed to execution of computer applications. Long-term storage of programs and data is provided by high-capacity memory devices 188, such as magnetic hard drives or optical CD or DVD drives.

In a typical computer system, a considerable number of input/output devices are connected to the system bus 170 through input/output adapters 190. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 192 that are used to connect the system to other computer systems through intervening computer networks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. For example, while the provided description assumes that a primary data set is generated by a video camera mounted on a vehicle being used by the user who wants to build a simulated view, it is well within the scope of the invention for the user to be able to identify any video camera in the V2V network as the primary video camera, to build a simulated view using the identified video camera and transport that simulated view for presentation on a video display in his own vehicle. Moreover, while the invention has been described for use in a V2V network, it obviously has applicability to other networks where multiple video cameras may share video data; e.g., multi-camera video surveillance systems.

Having thus described the invention of the present application in detail and by reference to preferred embodiments thereof, it will be apparent that modifications and variations are possible without departing from the scope of the invention defined in the appended claims.

What is claimed is:

1. A computer program product for determining which live video data stream is to be presented on a video display used by a first participant in a vehicle to vehicle network in which multiple participants produce live video data streams from video cameras of plural vehicles that may be shared among other participants, said computer product including a non-transitory computer readable medium having computer usable program code embodied therewith, said computer usable program code comprising:

computer usable program code configured to receive live video data streams currently being presented on video displays used by a plurality of other of participants;

computer usable program code configured to identify which of said received live video data streams is currently being presented on displays used by a greatest number of participants in a predefined geographic location and is further configured to identify which of said received live video data streams is in a predefined subset that is to be considered and is configured to tally the number of participants corresponding to the predefined subset to determine which video stream is currently being presented on displays used by a greatest number of participants in the subset and is further configured to automatically switch the video data stream currently being presented on the video display used by said first participant when the video data stream currently being presented on displays used by the greatest number of participants changes from the video data stream currently being presented; and computer usable program code configured to present the identified video data stream on the video display used by said first participant.

2. The computer program product according to claim 1 further comprising:

computer usable program code configured to determine whether the video data stream currently being presented on the video display used by said first participant is different than said identified video data stream;
computer usable program code configured to provide an indicator to the first participant that the video data stream currently being presented is not said identified data stream; and
computer usable program code configured to, in response to an input from said first participant, switch the video data stream being presented to said identified video data stream.

3. The computer program product according to claim 1 further comprising computer usable program code configured to initiate execution of the other computer usable program code as the first participant joins the network.

4. The computer program product according to claim 1 further comprising: computer usable program code configured to receive an override video data stream produced by another network participant; and computer usable program code configured to replace the video data stream currently being presented with the received override data stream.

5. The computer program product according to claim 4 wherein said override video data stream is received from a source outside the vehicle-to-vehicle network.

6. A system comprising a video display and a controller for selecting a live video from a vehicle video camera to be presented on said video display being used by a first vehicle to vehicle network participant, said controller comprising:
a video input system for receiving live video data streams from vehicle video cameras of other participants in the vehicle to vehicle network;
a video storage module for storing received video data streams;
a popularity logic module for determining which of the received live video data streams is currently being viewed by a greatest number of other participants in the vehicle to vehicle network; and
a video output system for directing the received live video stream currently being viewed by the greatest number of other participants in a predefined geographic location to the video display being used by the first network participant the video output system being further configured to identify which of said received live video data streams is in a predefined subset that is to be considered and is configured to tally the number of participants corresponding to the predefined subset to determine which video stream is currently being presented on displays used by a greatest number of participants in the subset and is further configured to automatically switch the video data stream currently being presented on the video display used by said first participant when the video data stream currently being presented on displays used by the greatest number of participants changes from the video data stream currently being presented.

7. The system according to claim 6 further comprising a user input module for receiving user input identifying a particular video data stream to be presented on the video display, said video output system being responsive to received user input identifying a particular video data stream to direct the user-identified video data stream to the video display.

8. A system comprising a video display and a controller for selecting a live video from a vehicle video camera to be presented on said video display being used by a first vehicle to vehicle network participant, said controller comprising:
a video input system for receiving live video data streams from vehicle video cameras of other participants in the network;
a video storage module for storing received video data streams;
a popularity logic module for determining which of the received live video data streams is currently being viewed by a greatest number of other participants in the vehicle to vehicle network; and
a video output system for directing the received live video stream currently being viewed by the greatest number of other participants in a predefined geographic location to the video display being used by the first network participant and further comprising detector logic for detecting a received video data stream having an override priority, said video output system being responsive to detection of a received video data stream having an override priority to direct said video data stream to the video display.

9. The system according to claim 6 wherein at least one video data stream originates outside the vehicle-to-vehicle network.

10. The computer program product according to claim 1 wherein the predefined geographic location includes an area ahead of said first participant.

11. The computer program product according to claim 1 wherein the predefined geographic location includes a vicinity of a vehicle traffic slowdown.

12. The computer program product according to claim 1 wherein the predefined subset is based on travel of said other participants relative to said first participant.

13. The computer program product according to claim 12 wherein the predefined subset causes video data streams received from said other participants that are traveling in an opposite direction relative to the direction of travel of said first participant to be filtered from consideration.

14. The computer program product according to claim 12 wherein the predefined subset causes video data streams received from said other participants that are traveling behind said first participant to be filtered from consideration.

15. The computer program product according to claim 1 wherein the identified video data stream is presented on the video display used by said first participant for at least a duration of a predetermined refresh interval.

* * * * *